United States Patent
Hwang et al.

[11] Patent Number: 6,053,042
[45] Date of Patent: Apr. 25, 2000

[54] FREQUENCY-ANALYSIS-TYPE WATER LEVEL MEASURING METHOD AND DEVICE THEREFOR

[75] Inventors: Jeong-Ki Hwang; Moon-Wook Lee; Sang-Gyoon Chang; Hyun-Min Kim; Choong-Hee Jo, all of Daejeon-Si, Rep. of Korea

[73] Assignee: Korea Power Engineering Company, Incorporation, Kyunggi-do, Rep. of Korea

[21] Appl. No.: 08/934,020

[22] Filed: Sep. 19, 1997

[30] Foreign Application Priority Data

Nov. 20, 1996 [KR] Rep. of Korea ................. 96-55753

[51] Int. Cl.[7] ................................ G01F 23/296
[52] U.S. Cl. ........................ 73/290 V; 73/49.2
[58] Field of Search ................... 73/290 V, 1.73, 73/290 B

[56] References Cited

U.S. PATENT DOCUMENTS 1,956,920  5/1934  Haltmeier ................. 73/290 V
4,170,311  10/1979  Spaw ..................... 73/290 V
4,599,892  7/1986  Doshi ...................... 73/49.2

*Primary Examiner*—Hezron Williams
*Assistant Examiner*—Michael Cygan
*Attorney, Agent, or Firm*—Arent Fox Kintner Plotkin & Kahn, PLLC

[57] ABSTRACT

A method and device of measuring a water level of a frequency analysis type is disclosed. The device is consisted of a pipe type of which immersed length is in a proportion to the water level and which is installed in a container having a fluid, a signal detecting device which has an impact apparatus to provide a source signal periodically or continuously and a impact detecting sensor(s) which gets a response signal of the pipe by the impact apparatus, and a signal analyzer which processes the signal from the impact detecting sensor. The method comprises steps of: generating a source signal to the pipe by the impact apparatus; detecting the response signal of the pipe according the water level by the impact detecting sensor; analyzing the response signal to the frequency response spectra by the signal analyzer; and measuring the water level by comparing to the predetermined frequencies which was obtained by the signal analyzer.

5 Claims, 3 Drawing Sheets

FREQUENCY-ANALYSIS-TYPE WATER LEVEL MEASURING METHOD AND DEVICE THEREFOR

BACKGROUND OF THE INVENTION

1. Field of the Invention

The present invention relates to a frequency-analysis-type water level measuring method and a device therefor, and more particularly, to a method of measuring a water level using response signals indicating effects of impacts actuated during storage or flow of fluid in a container, and a device therefor.

The measuring device according to the present invention can be applied to an open container or a closed container, and to a container not only containing a fluid under normal temperature and pressure but also a container including a fluid under high temperature and pressure.

The device of the present invention adopts a principle that as the measuring device is immersed in a fluid deeply, the natural frequency of the device becomes lower, and as the depth thereof becomes shallower, that of the device becomes higher.

When an impact is applied to the device, response signal according to a water level appears different. The response signals are detected by a impact detecting sensor to analyze a frequency so that a frequency characteristic corresponding to the water level is shown. Accordingly, the water level can be measured by comparing the frequency characteristic with a previously input frequency characteristic according to water levels. Also, it is advantageous to detect the change of a water level in the container continuously by a trend of frequency characteristic measured only.

2. Description of the Related Art

In a conventional water level measuring device of a thermal transmission type used for the reactor in a nuclear power plant of a light-water type, there is discontinuity in measuring a water level which dominates accuracy of the water level measuring according to the number of thermal transmitting portions installed inside the measuring device. Thus, an operator in a power station cannot recognize the increase or decrease of the water level when the water level is positioned between the thermal transmitting portions.

When the water level measuring device of the frequency analysis type is installed in the reactor vessel of a nuclear power plant, the water level can be continuously measured so that the increase/decrease of the water level can always be recognized by the operator. Also, there is no delay effect of signals due to the sensor characteristic appearing in the water level measuring device of the thermal transmitting type.

SUMMARY OF THE INVENTION

To overcome the above problems, it is an object of the present invention to provide a method of measuring a water level using response signals indicating effects of impacts actuated during storage or flow of fluid in a container, and a device therefor.

Accordingly, to achieve the above object, there is a method of measuring the water level by a frequency analysis device. The device is consisted of a pipe type of which immersed length is in a proportion to the water level and which is installed in a container having a fluid, a signal detecting device which has an impact apparatus to provide a source signal periodically or continuously and a impact detecting sensor(s) which gets a response signal of the pipe by the impact apparatus, and a signal analyzer which processes the signal from the impact detecting sensor. The method comprises steps of generating a source signal to the pipe by the impact apparatus; detecting the response signal of the pipe according the water level by the impact detecting sensor; analyzing the response signal to the frequency response spectra by the signal analyzer; and measuring the water level by comparing to the predetermined frequencies which was obtained by the signal analyzer.

DETAILED DESCRIPTION OF THE PREFERRED EMBODIMENT

Figure 1:
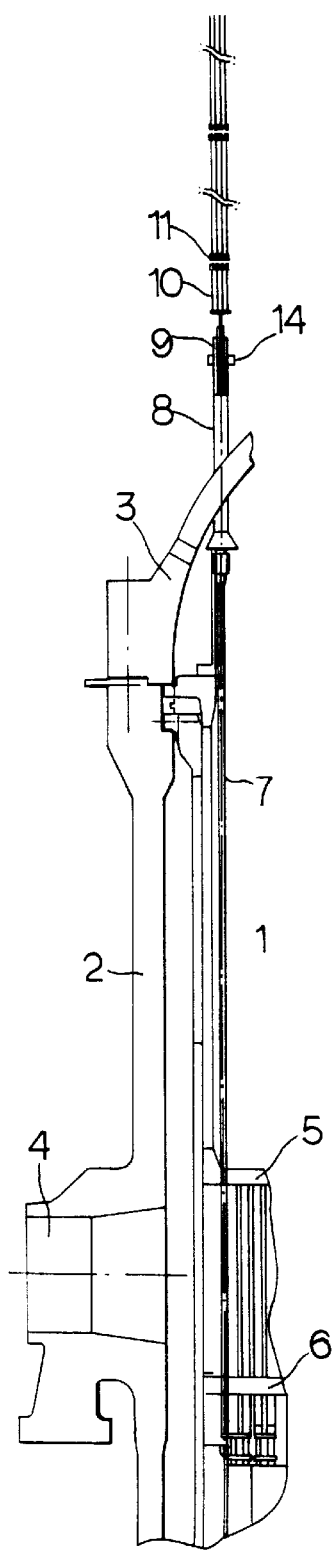
FIG. 1 is a vertical side view of a part of the reactor vessel.
Figure 2:
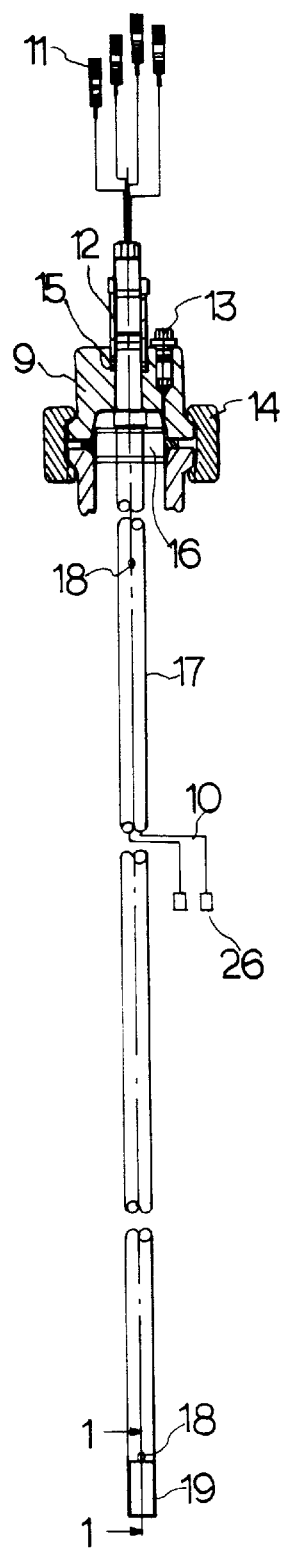
FIG. 2 is a view schematically showing a measuring device.

Referring to FIG. 1, the inside 1 of the reactor vessel is isolated in pressure by a reactor vessel body 2 and a reactor vessel head 3. As shown in FIGS. 1 and 2, an external pipe 7 of a signal detecting device 17 is fixed to a nozzle 8. The signal detecting device 17 is installed by passing through the head 3 and fixed to a flange assembly 9 coupled to the nozzle 8. The nozzle 8 adheres to the head 3 and coupled to the flange assembly 9 by a gray lock clamp 14. Here, when the nozzle 8 and the gray lock clamp 14 are coupled with each other, a water-sealing ring 15 prevents leakage around a coupling portion fixes the flange assembly 9 and the water level detecting device 17, and an air vent plug 13 is installed for the venting of the inside of the nozzle 8.

The signal detecting device 17 and the external pipe 7 of the signal measuring device should not generate interference due to the physical contact between them. The external pipe 7 is for protecting the signal measuring device 17 and stabilizing the water level of a portion where there is a severe flow of a fluid such as in the inside 1 of the reactor vessel. The signal measuring device 17 and the external pipe 7 of the signal measuring device are installed to be perpendicular to a water surface to be measured, to thereby be in a linear proportion to the depth of the water level. The external pipe 7 can be connected with at least one or more pipe(s) and have at least one or more holes to each of the upper and lower portion thereof. The size of the hole should be enough to keep the water levels of the inside and outside of the external pipe 7 equal according to the change of the water level of a fluid container. Also, the external pipe 7 extends from the nozzle 8 of the head 3 to a nuclear fuel array plate 6 via reactor internals 5.

FIG. 2 schematically shows a water level measuring device of a frequency analysis type, which includes a device to be installed in a light-water reactor.

Figure 3:
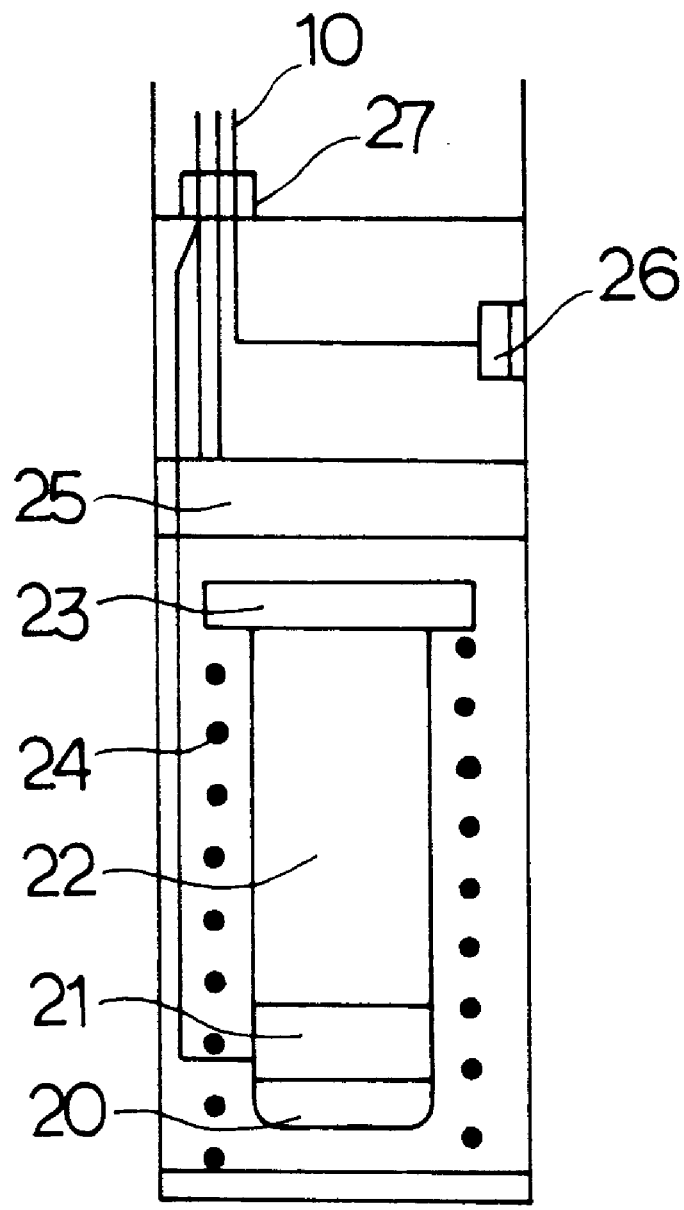
FIG. 3 is a sectional view of an impact device taken along 1—1 line of FIG. 2.

The signal measuring device 17 is composed of a pipe for detecting signals, an impact apparatus 19 for applying impacts to the pipe, and at least one or more impact detecting sensor 26 (FIG. 3). A pipe wall exhibiting the vibration characteristic in a longitudinal direction rather than that in a radial direction should be selected as the signal detecting pipe. To get a good dynamic characteristics of the immersed pipe for signal detection, a hole 18 for passing a fluid is provided at least one or more at the respective upper and lower portions of the pipe 17. The fluid passing hole for passing a fluid should have a diameter such that no difference of the water level between the outside and inside of the fluid passing pipe with respect to the change of the maximum water level available in the fluid container.

The impact apparatus 19 which applies an impact to the signal measuring device 17 can be installed at the upper or lower portion of the pipe 17 for signal detection or the flange assembly 9. The detecting signal is analyzed to frequency response spectra using a computer including a program for frequency analysis or a frequency analyzing device. The analyzed frequency signal indicates a large value at about the natural frequency of the signal detecting device 17 including the effects of the immersion depth of the signal detecting pipe 17. Prior to installation of the signal measuring device 17, the result of the frequency analysis according to the immersion depth of the signal detecting pipe is previously input to the computer. The water level can be obtained by comparing the input value with an actually measured value at a particular water level. The value used for the water level measuring is a resonant frequency so that the set frequency by each water level is compared with a measured frequency. The frequency has the maximum signal value at about a portion where a signal beyond a predetermined size. There occurs interference in measuring a water level due to a signal of an external interference in a measured frequency signal in this case. Thus, by operating the impact device 19 several times to find a linear-average, the response frequency spectra by the external interference are disappeared due to phase difference.

FIG. 3 shows a structure of the impact device 19 to be installed at the lower portion of the signal detecting device 17. The impact device 19 is composed of an impact apparatus 20, an impact sensor 21, an impact mass regulator 22, a magnet 23, a spring 24 and an electromagnet 25. The impacter 20, the impact sensor 21, the impact mass regulator 22, and the magnet 23 are incorporated in an assembly and perform a function of directly applying an impact to a part of the signal detecting device 17 by the magnet 23, the spring 24 and the electromagnet 25. The impact sensor 21 indicates an impact start time when an impact is applied to the signal detecting device 17. The signal indicated by the signal detecting device 17 by the impact is obtained at the impact detecting sensor 26 and the frequency analyzing device transforms the detecting signal to frequency response spectra. The frequency analysis is done with a reference time when a signal is input into the impact sensor 21. A cable for driving the electromagnet 25, and transmitting the signals of the impact sensor 21 and the impact detecting sensor 26 is connected to the outside via a socket of a water-sealing type. The impact device 19 is installed at the best place where a signal is effectively transmitted to the signal measuring device 17 and the impact detecting sensor 26 is installed at a place where all the signals of the signal detecting device 17 are well captured. The magnitude of detecting signal is different from the place where the impact detecting sensor 26 is installed along the longitudinal direction of the signal detecting device 17. There is some places where the signal is not detected by the impact detecting sensor 26. Thus the places to be installed the impact detecting sensor 26 on the signal detecting device 17 is selected carefully.

The measuring device according to the present invention can be applied to an open container or a closed container, and to a container not only containing a fluid under normal temperature and pressure but also a container including a fluid under high temperature and pressure.

The device of the present invention adopts a principle that as the measuring device is immersed in a fluid more deeply, the natural frequency of the device becomes lower, and as the depth thereof becomes shallower, that of the device becomes higher.

When an impact is applied to the device, response signal according to a water level appears different. The response signals are detected by a impact detecting sensor to analyze a frequency so that a frequency characteristic corresponding to the water level is shown. Accordingly, the water level can be measured by comparing the frequency characteristic with a previously input frequency characteristic according to water levels. Also, it is advantageous to detect the change of a water level in the container continuously by a trend of frequency characteristics measured only.

Though the present invention has been described with an example of an reactor vessel, it is possible to be applied to a water level measurement in a general industrial equipment.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of measuring a water level of a frequency analysis type in a device where a pipe type of which immersed length is in a proportion to the water level and which is installed in a container having a fluid, a signal detecting device which has an impact apparatus to provide a source signal periodically or continuously and a impact detecting sensor(s) which gets a response signal of the pipe by the impact apparatus, and a signal analyzer which processes the signal from the impact detecting sensor, said method comprising the steps of:

generating a source signal to the pipe by the impact apparatus;

detecting the response signal of the pipe according the water level by the impact detecting sensor;

analyzing the response signal to the frequency response spectra by the signal analyzer; and measuring the water level by comparing to the predetermined frequencies which was obtained by the signal analyzer.

2. A device for measuring a water level of a frequency analysis type comprising:

a pipe type of which immersed length is in a proportion to the water level and which is installed in a container having a fluid, a signal detecting device which has an impact apparatus to provide a source signal periodically or continuously and a impact detecting sensor(s) which gets a response signal of the pipe by the impact apparatus, and a signal analyzer which processes the signal from the impact detecting sensor.

3. A device for measuring a water level of a frequency analysis type as claimed in claim 2, wherein a hole for passing a fluid is provided at upper and lower portions of said signal measuring device.

4. A device for measuring a water level of a frequency analysis type as claimed in claim 2, wherein an external pipe 7 of said signal measuring device is installed at the outside of said signal measuring device to secure a stable fluid surface with respect to the movement of a fluid inside a container and connected at least one unit to block a signal occurring from the outside.

5. A device for measuring a water level of a frequency analysis type as claimed in claim 4, wherein a hole for passing a fluid is provided at upper and lower portions of said signal measuring device.

* * * * *